FIG. 6b.

J. MURRAY.
LINING MACHINE FOR BOOKS.
APPLICATION FILED OCT. 21, 1914.

1,263,273.

Patented Apr. 16, 1918.
14 SHEETS—SHEET 10.

INVENTOR

JOHN MURRAY

BY his ATTORNEYS

J. MURRAY.
LINING MACHINE FOR BOOKS.
APPLICATION FILED OCT. 21, 1914.

1,263,273.

Patented Apr. 16, 1918.
14 SHEETS—SHEET 12.

WITNESSES

INVENTOR
JOHN MURRAY
BY
his ATTORNEYS

UNITED STATES PATENT OFFICE.

JOHN MURRAY, OF EDINBURGH, SCOTLAND.

LINING-MACHINE FOR BOOKS.

1,263,273.  Specification of Letters Patent.  Patented Apr. 16, 1918.

Application filed October 21, 1914.  Serial No. 867,872.

*To all whom it may concern:*

Be it known that I, JOHN MURRAY, a subject of the King of Great Britain and Ireland, and a resident of Edinburgh, Scotland, have invented certain new and useful Improvements in Lining-Machines for Books, of which the following is the specification.

The invention relates to the type of book lining machine described in the specification of my prior Patent No. 982,438, dated Jan. 24, 1911, and has for its object certain detail improvements therein. Namely, the provision of improved means for supporting the books during their passage through the machine, and means for the adjustment thereof, improved means for the cutting off, trimming and applying of paper to the glued backs of the books, improved means for pressing down the applied paper into close contact with the books, and improved means for feeding the books step-by-step, either entirely through the machine, or to that point at which paper is applied to their backs.

In order that the invention and the manner of performing the same may be properly understood there are hereunto appended twelve sheets of explanatory drawings in which Figure 1 is a partial end elevation of the improved means for supporting the books on their passage through the machine and means for the adjustment thereof;

Fig. 1$^a$ is a continuation of the right hand end of Fig. 1;

Figs. 4$^a$, 4$^b$ and 4$^c$ constitute together a partial front elevation of the improved means for the cutting off, trimming and applying of paper to the glued backs of the books; the arrangement of the sheets is such that Fig. 4$^c$ lies to the right of and Fig. 4$^a$ below Fig. 4$^b$;

Figs. 5$^a$ and 5$^b$ constitute together a sectional end elevation on the line $a$—$a$, Fig. 4$^c$; the arrangement of the sheets being such that Fig. 5$^b$ forms a downward continuation of Fig. 5$^a$;

Fig. 5$^c$ is a plan of a detail;

Figs. 6$^a$ and 6$^b$ constitute together a transverse section on the line $b$—$b$, Fig. 4$^b$, the arrangement of the sheets being such that Fig. 6$^b$ forms a downward continuation of Fig. 6$^a$;

Figures 1, 1A:
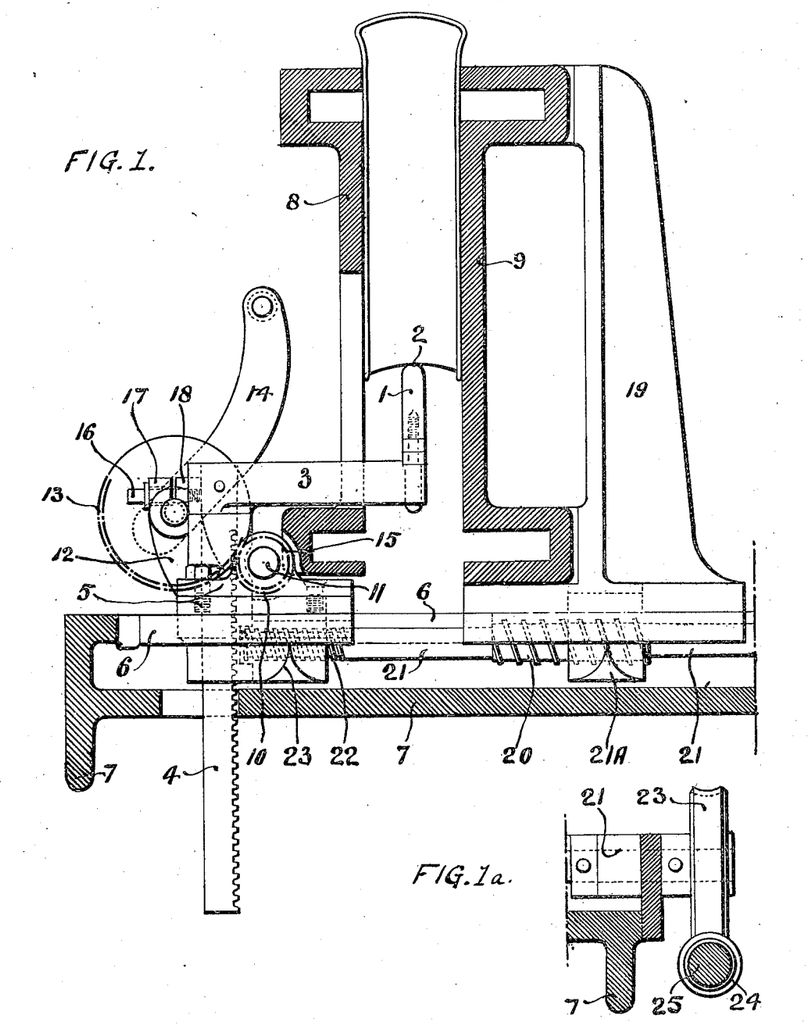
Figure 2:
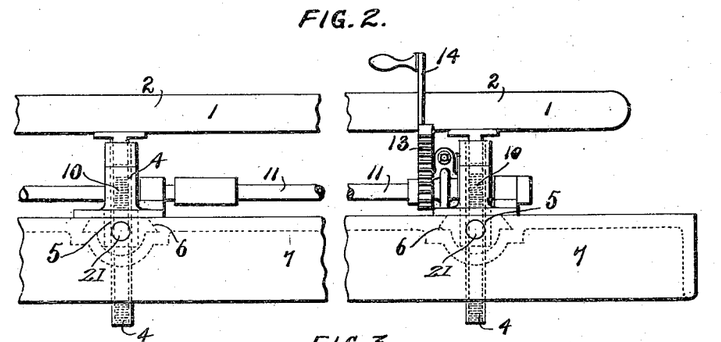
Figs. 2 and 3 (drawn to a smaller scale than Fig. 1) are respectively front elevation and plan of the portion of the machine shown in Fig. 1.
Figure 3:
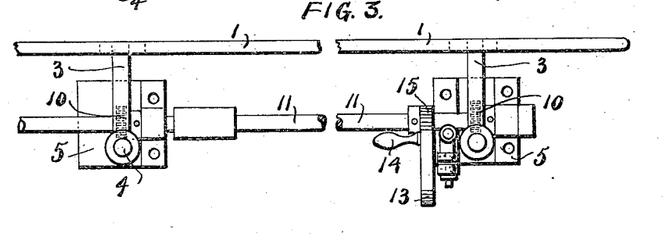

As shown in Figs. 1, 2 and 3, the books are centrally and longitudinally supported on a longitudinal rail 1, the upper surface 2 of which is curved to fit within the curve of the fore edges of the books. The rail 1 is carried on a series of bracket arms 3 supported in turn on a series of vertical rack bars 4 guided in brackets 5 which slide in guides 6 in a framing 7 beneath and transverse to main rails 8, 9. The rack bars 4 are engaged by a series of pinions 10 on a horizontal shaft 11, also carried in the rail brackets 5. One of the brackets 5 has on it an extension 12 in which is pivoted a toothed quadrant 13 operated by a handle lever 14. The quadrant 13 gears with a pinion 15 (Fig. 3) secured on the shaft 11. Thus rotation of the quadrant 13 by the handle lever 14 raises or lowers all the rack bars 4 and with them the fore edge guide rail 1 simultaneously for the latter's adjustment for various widths of book.

The upper end of the extension 12 is split, and a set screw 16, passed through the one half 17 of the split part and screwed into the other half 18, is provided by means of which all the parts are secured in position.

In order to adjust the parts for various thicknesses of book, brackets 19 supporting one main rail 9 are carried in the guides 6 and each bracket is adjusted toward or away from the fixed main rail 8 by a screwed part 20 on a shaft 21 engaging a nut 21ᴬ on the bracket. The shaft 21 is also threaded at its opposite end at 22 at the ratio of 1 to 2 with relation to the threads 20 so that the nut 23 on the rail bracket 5 moves half the distance of the nuts 21ᴬ on the bracket 19. The ends of the several screwed shafts have fixed on them worm wheels 23 which are rotated by worms 24 fixed on a shaft 25 which may be rotated by a hand wheel or other suitable device.

Figure 4A:
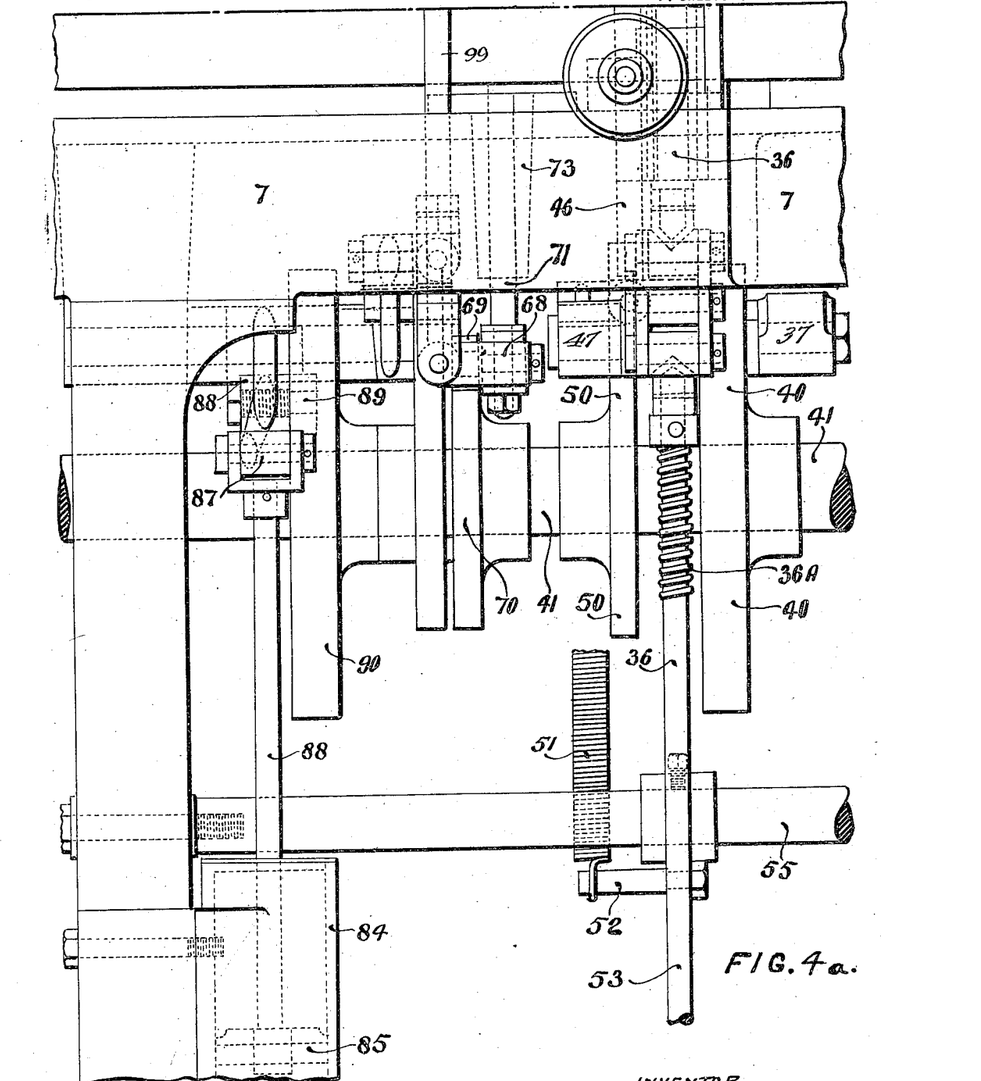
Figure 4B:
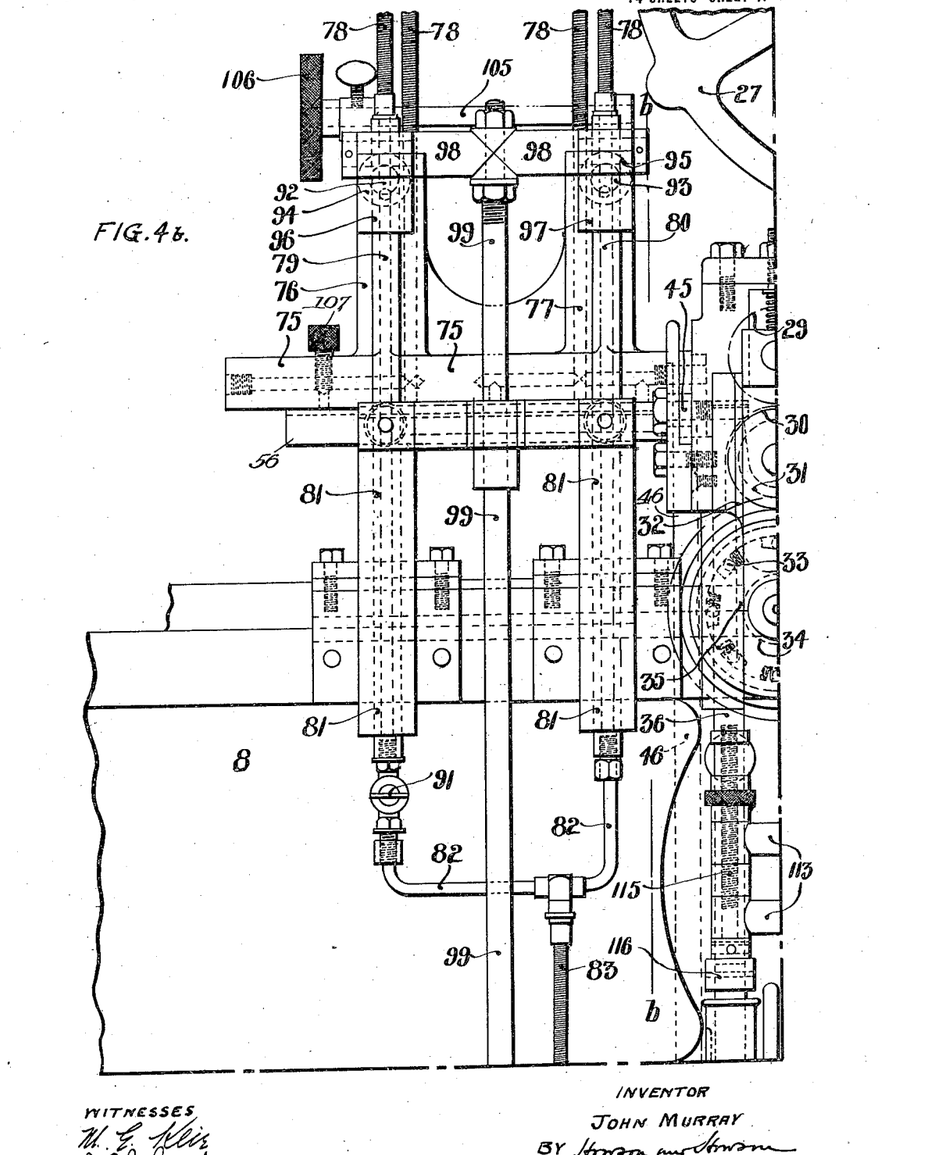
Figure 4C:
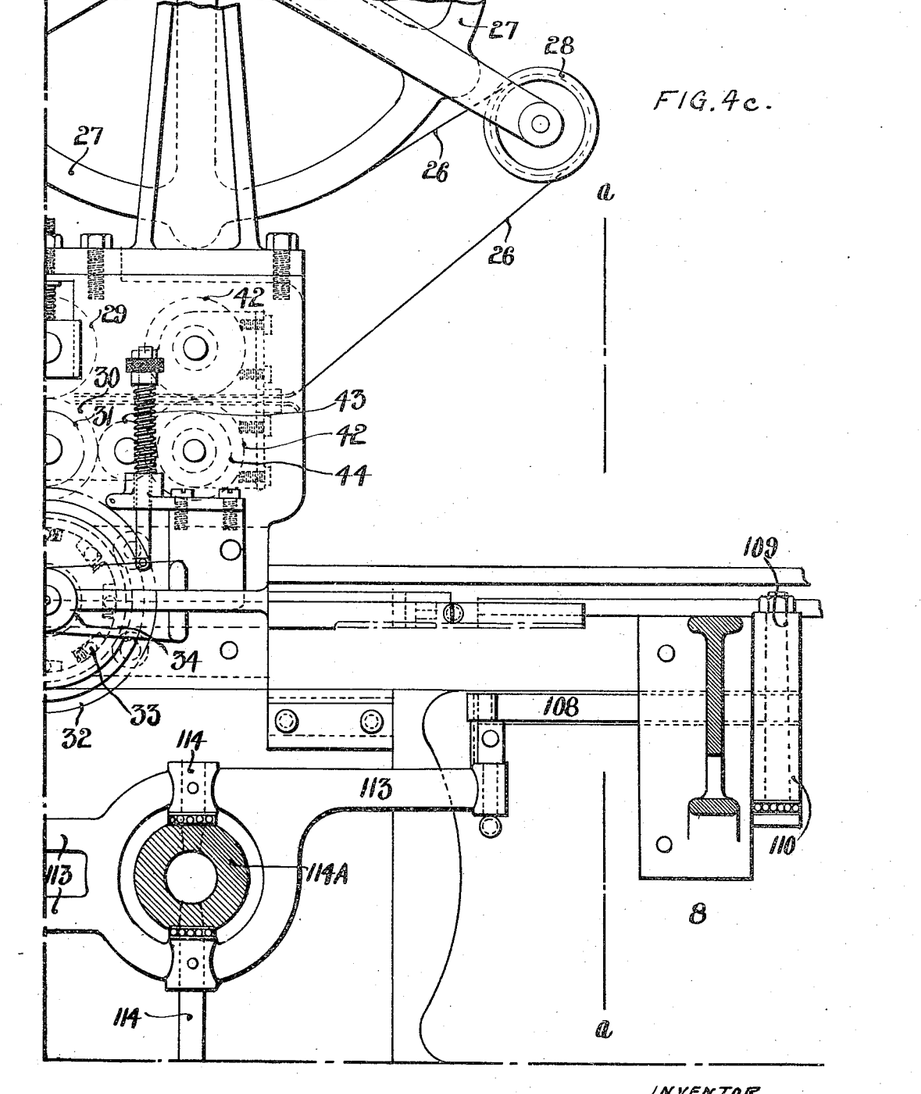
Figure 5A:
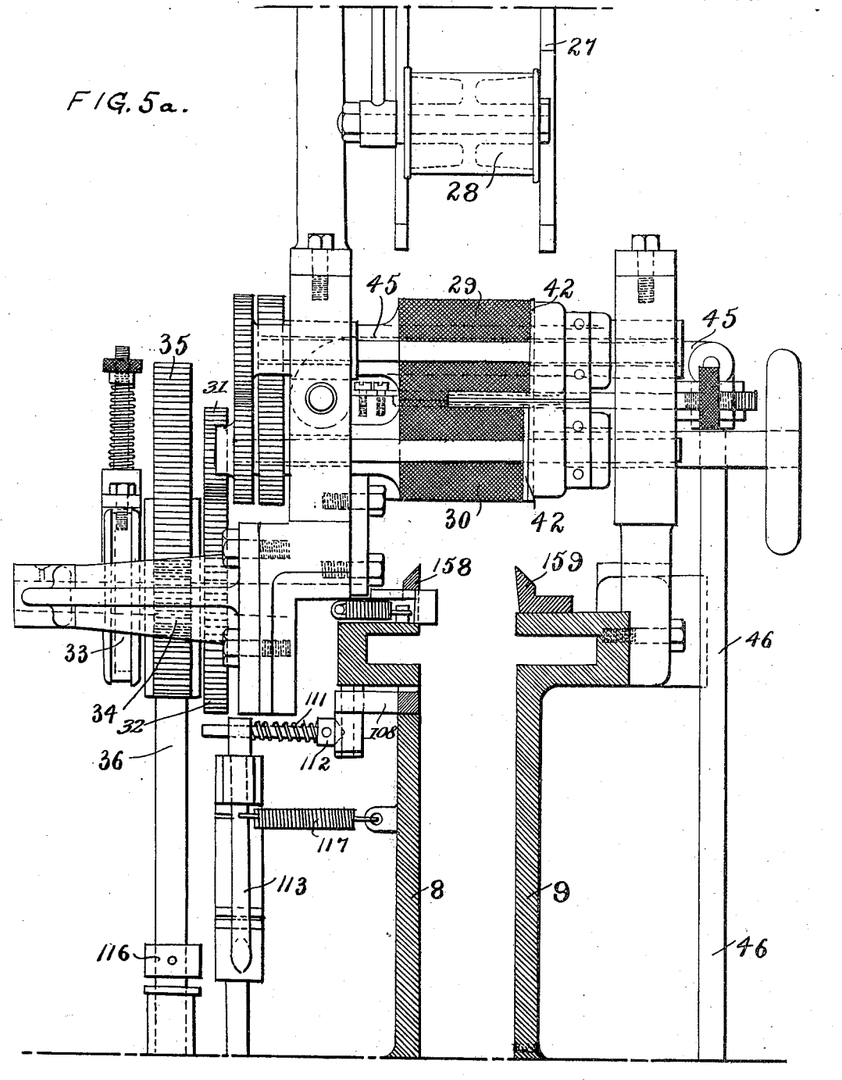
Figure 5B:
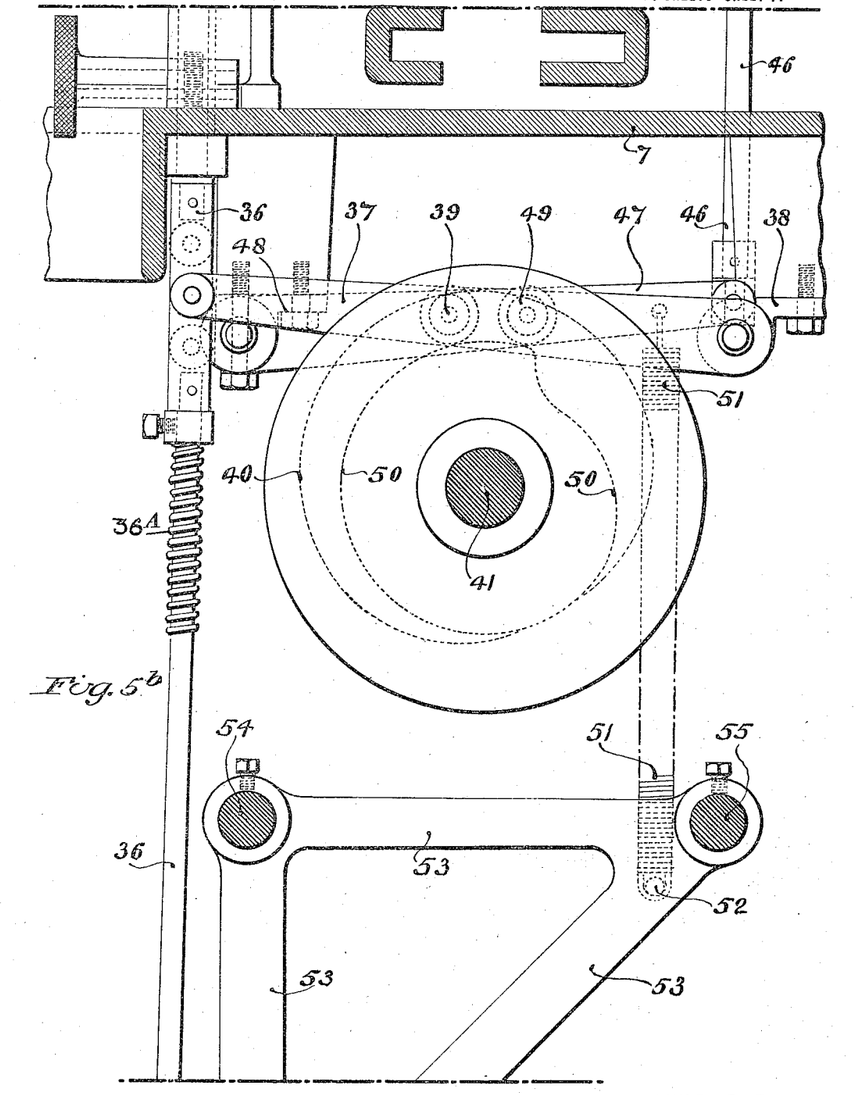
Figure 5C:
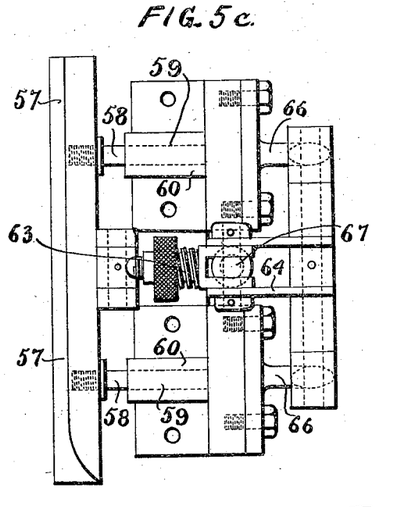
Figure 6A:
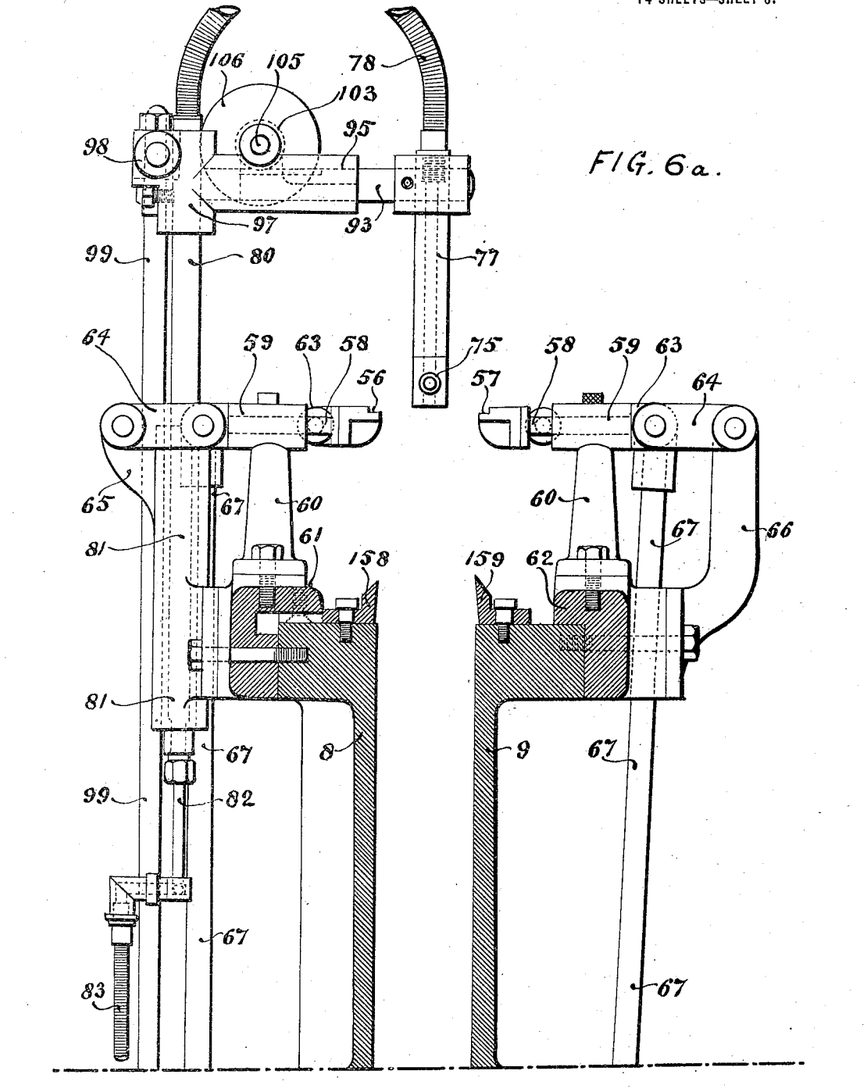
Figure 6B:
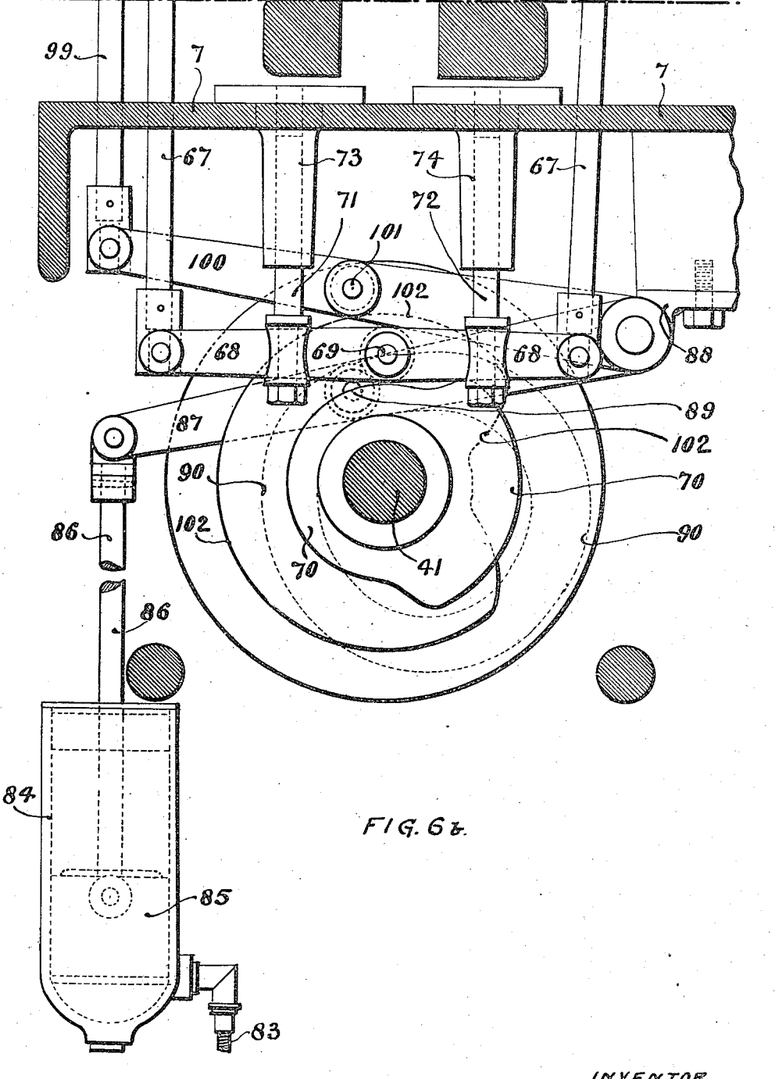

In Figs. 4ᵃ, ᵇ, ᶜ, 5ᵃ, ᵇ, ᶜ, and 6ᵃ and ᵇ are shown the means for feeding, cutting off, and laying down the paper on the backs of the books. Paper 26 of a width equal or approximately equal to the width of the book back is drawn from a roll 27 above the books over a guide pulley 28 by rotary gripping rollers 29, 30. These rollers are intermittently driven by a pinion 31 on the roller 30 gearing with a pinion 32 fixed on the same shaft as a ratchet clutch 33 which in turn is driven by a pinion 34 also on the same shaft as the ratchet clutch and operated by a rack 35 on an upright rod 36 working against the action of a spring 36ᵃ connected to a lever 37 pivoted in a bracket 38 fixed on the underside of the framing 7, said lever 37 carrying a roller 39 operated by a cam 40 on the main driving shaft 41 of the machine. The paper 26 is if necessary firstly drawn through rotary trimming knives 42 operated by pinions 43, 44 and 31, trimming it to the exact width, and then past a transversely reciprocating cutting off knife 45 connected to one end of a rod 46, the other end of the rod 46 being connected to one end of a lever 47, the other end of which lever is pivoted in a bracket 48 fixed to the underside of the framing 7, said lever 47 bearing a roller 49 operated by a cam 50 on the main shaft 41. The lever 47 is further controlled by a spring 51, one end of which spring is attached to the lever 47 near its connection to the rod 46, the other end of the spring being held on a pin 52 in a bracket 53 carried by rods 54, 55, which lie below and parallel with the main driving shaft 41 and are carried in the upright end frames of the machine.

From the cutting-off knife the paper passes to a suction device to be hereinafter described by which it is seized and placed upon the already glued back of the book. In order that the paper may be placed in exact position, before it is seized by the suction device, or after the suction is cut off, it is projected between longitudinal guide ledges 56, 57 on which it lies to be picked up by the suction device. These guide ledges 56, 57 which lie above the book back and parallel to the main rails 8, 9 are carried by pins 58 which move laterally in guide holes 59 in the top of brackets 60 which in turn are fixed to brackets 61, 62 fixed to the main rails 8, 9. Pairs of toggle links 63, 64 of which the links 63 are adjustable, are pivotally connected to the guide ledges 56, 57 and top of the brackets 65, 66, and the pivotal connections of the toggle links to each other are also connected to the ends of vertical rods 67, the other ends of said rods being pivotally connected to the opposite ends of a cross lever 68 bearing a roller 69 operated by a cam 70 fixed on the main shaft 41. The ends of the cross lever are constrained to move simultaneously in the same direction by pins 71, 72 fixed at opposite sides of the center of the cross lever and working in vertical guides 73, 74 in the underside of the framing 7.

The suction device (shown in Figs. 4ᵃ, 4ᵇ and 6ᵃ, 6ᵇ) consists of a nozzle plate 75 which lies above and parallel to the guide ledges 56, 57 and has upstanding tubular parts 76, 77 on it connected by flexible tubes 78, to vertical tubes 79, 80 carried by tubular brackets 81 fixed to the main rail 8. The bottom ends of the tubes 79, 80 are connected by a tube 82 and flexible tube 83 to the bottom of a suction pump 84, the plunger 85 of which is reciprocated by its rod 86 which is engaged by a lever 87 pivotally connected to a bracket 88 fixed to the underside of the framing 7 and bearing a roller 89 engaged by a cam 90 fixed on the main shaft 41. The connection of the tube 82 to the tube 79 is controlled by a valve 91.

In order that the nozzle plate 75 may be lowered to and raised from the book back, the upstanding tubular parts 76, 77 are carried on horizontal spindles 92, 93 which are supported in horizontal tubular extensions 94, 95 on tubular brackets 96, 97 which are fixed to the top parts of the vertical tubes 79, 80. These tubular brackets 96, 97 are connected by a cross piece 98 to which the top end of a vertical rod 99 is bolted. The bottom end of this vertical rod 99 is pivoted to a lever 100, whose opposite end is pivotally connected to the bracket 88, and bears a roller 101 operated by a cam 102 fixed on the main shaft 41.

Further in order that the nozzle plate 75 may be adjusted centrally between the guide ledges 56, 57, the spindles 92, 93 have rack teeth cut on them which are operated by pinions 103 fixed on a spindle 105, carried in brackets on the extensions 94, 95 and operated by a handle 106. A small valve 107 is also provided on the nozzle plate 75 for cutting out the outer suction aperture.

The sequence of operations is that firstly the requisite length of paper is fed from the roll 27 and its edges trimmed if necessary, when fed out it rests between and on the longitudinal guide ledges 56, 57 which at this time are advanced toward one another, it is then seized by the suction device which is thrown into operation by the suction pump 84 worked by the cam 90, the paper is then cut off. The guide ledges are retracted and at the same time the suction device then moves downward toward the book, and finally the paper is placed upon the book back, suction cut off from the suction device, that device is withdrawn and the paper left in position on the book back.

The feed mechanism for the lining sheets is put into operation by the book as it passes along between the main rails of the machine. Protruding into the path of the book is an inclined arm 108 which is displaced by the book, and which in turn operates a trip lever which permits the feed rollers 29, 30 to come into operation at the correct time. If a book is missed the feed mechanism is not operated and consequently no paper is fed. As the books passing along between the main rails approach the paper applying device, a pusher is slipped in behind them which brings forward the books and places them in the correct position for having the paper applied to their glued backs. The feed mechanism just described is brought into action by the book passing along between the main rails 8, 9, displacing the inclined arm 108 (protruding through a slot in rail 8) which is pivoted by pins 109 carried in bracket 110 which is fixed to rail 8. The inclined arm 108, through spring 111 carried on pin 112, operates trip lever 113. The trip lever 113 is pivoted on pins 114 in bracket 114^A fixed to rail 8. At the end of the trip lever 113, opposite to the end operated by the inclined arm, is a vertical screw 115 the head of which controls the position of a trip collar 116 fixed to upright rod 36 which operates the rack 35 which in turn operates the feed rollers 29, 30. When the book displaces the inclined arm 108, it compresses spring 111. As the trip collar is subjected at this time to the full pressure of the feed spring 36^A, the small spring is unable to operate the trip until the feed cam 40 rotates to a position where it takes up thrust of the spring. This relieves the pressure on trip collar and enables the small spring 111 to displace the trip lever; a further rotation of cam permits spring 36^A to operate the feed mechanism. The trip lever is returned to its position by means of spring 117.

Figure 7:
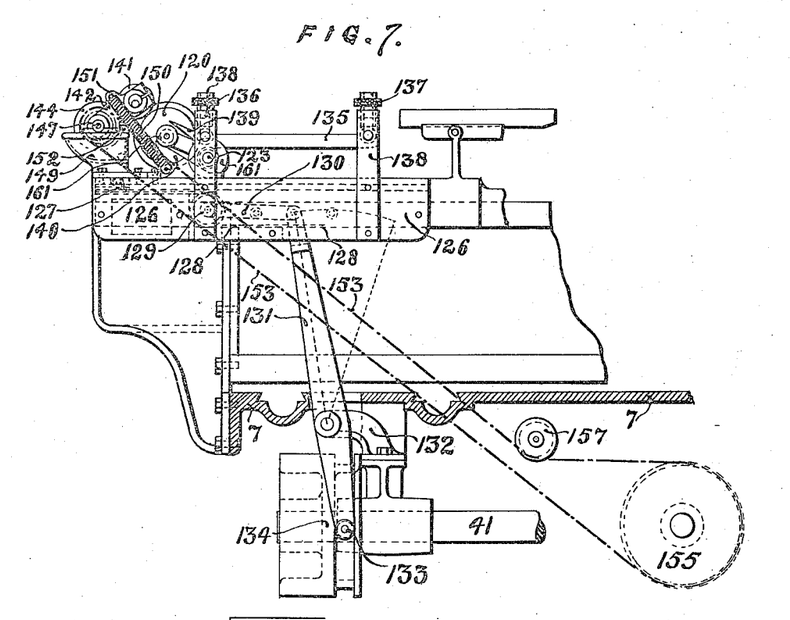
Figs. 7, 8 and 9 are respectively a front elevation partly in section, a plan and a sectional end elevation (to a smaller scale) of the improved means for rubbing down the applied paper into closer contact with the books.
Figure 8:
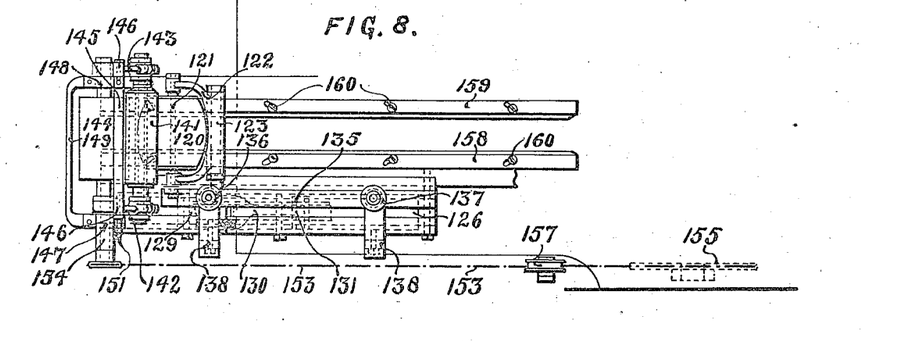
Figure 9:
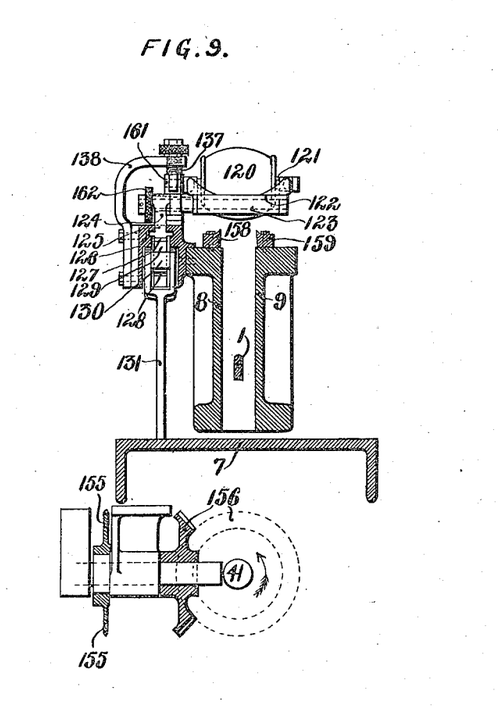

In order that the paper now laid upon the book back may be firmly rubbed down into contact with it, there is provided as shown in Figs. 7, 8, and 9 an improved rubbing down device. This device comprises a highly elastic roll 120 of such material that when pressed upon the book back it not only conforms to its general contour but forces its way into all those slight irregularities of surface caused by stitching, or by slight unevenness of the setting of the signatures. To this end the roll is preferably hollow, is made of rubber or other adequately flexible material, and is inflated with air under adequate pressure.

This roll is mounted transversely to the machine and above the main rails 8, 9 on a spindle 121 which is carried in the arms of a bracket 122 which in turn is carried on a spindle 123 also transversely journaled in a bracket 124. This bracket 124 extends upward from one end of T-guides 125 which slide longitudinally and parallel to the main rails in counterpart grooves on the upper end of a framing 126 fixed to the main rail 8. The underside of the T-guides has cut on it a rack 127. On the lower end of the framing and between its side members a rack 128 is fixed. A toothed wheel 129, pivoted between a jawed link 130 which in turn is pivoted to the jawed ends of a lever 131, gears with both these racks. This lever 131, which is pivoted to a bracket 132 fixed to the underside of the framing 7, is oscillated by a cam 134 on the main shaft 41 engaging a roller 133 on its other end. A rail 135, to regulate the pressure of the roll on the book back, is carried at its opposite ends by bolts 136, 137 adjustably suspended from the upper ends of brackets 138 fixed to the outside of the framing 126. One end of this rail has an inclined extension 139 on it for a purpose hereinafter stated. An inclined guide-piece 140 is also fixed to the upper side of the framing 126 directly beneath the inclined extension 139. A roller 161, pivoted on the inner end of the spindle 121 of the roll 120, runs between these guide surfaces 139, 140 so as to guide the roll 120 on to and away from the book back. In order that the roll 120 may be kept moist with water, there is provided a felt or like doctor roll 141 pivoted in eccentric bushes in the ends of lever brackets 142, 143. This doctor roll 141 engages with a like doctor roll 144 constantly running in water and rotating in brackets 147, 148 fixed to a water trough 149. The lever brackets are braced together by a distance rod 145 fixed in bosses 146, and are pivoted in brackets 147, 148, fixed to a water trough 149 which in turn is bolted to the top and outer end of the framing 126. In order that the doctor roll 141 may be kept with adequate pressure against the roll 120, a spring 150 is attached at one end to the top of the framing 126 and at the other end to an extension 151 on the end of the set pin fixing the one end of the distance rod 145.

to the boss 146. To prevent the spring pulling the doctor roll too far down a set pin 152 is screwed into one of the lever brackets 142 and engages the top edge of the water trough. The doctor roll 144 is driven by a sprocket chain 153 passing around a sprocket wheel on an extension of the spindle 154 on which the doctor roll 144 is mounted, and around a sprocket wheel 155 driven by bevel gear 156 from the main shaft 41. One side of the sprocket chain passes around a jockey pulley 157 fixed to the framing 7.

Rails 158, 159 for supporting the book by its joints are fixed on the top of and parallel to the inner edges of the main rails 8, 9 by set pins 160 passed through slots in rails 158, 159 and screwed into the tops of the main rails 8, 9. The slots allow of lateral adjustment of the rails 158, 159 to each other. Lateral movement of the roll 120 is provided by a screw device 162.

Figure 10:
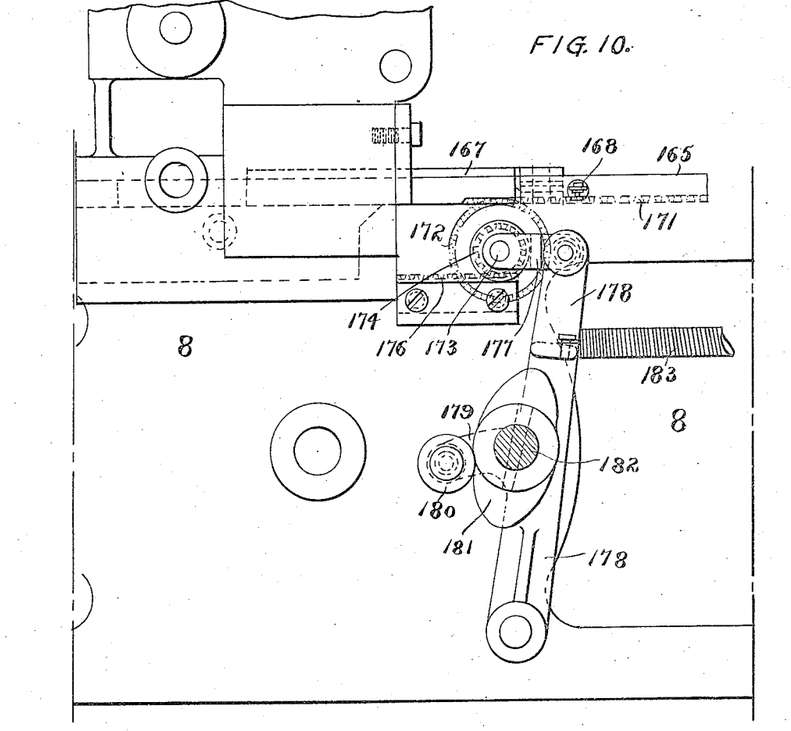
Figs. 10 and 11 are respectively a side elevation and a sectional plan of the book feeding device.
Figure 11:
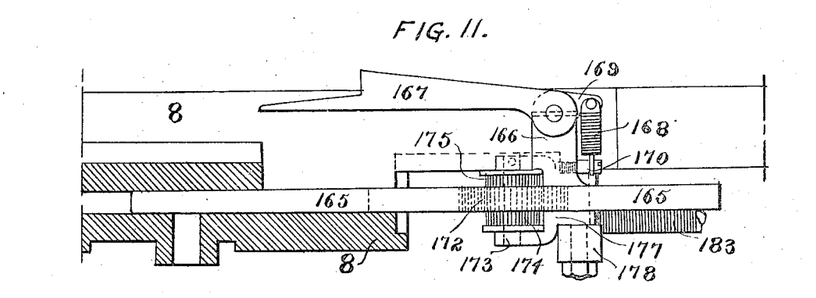
Figure 12:
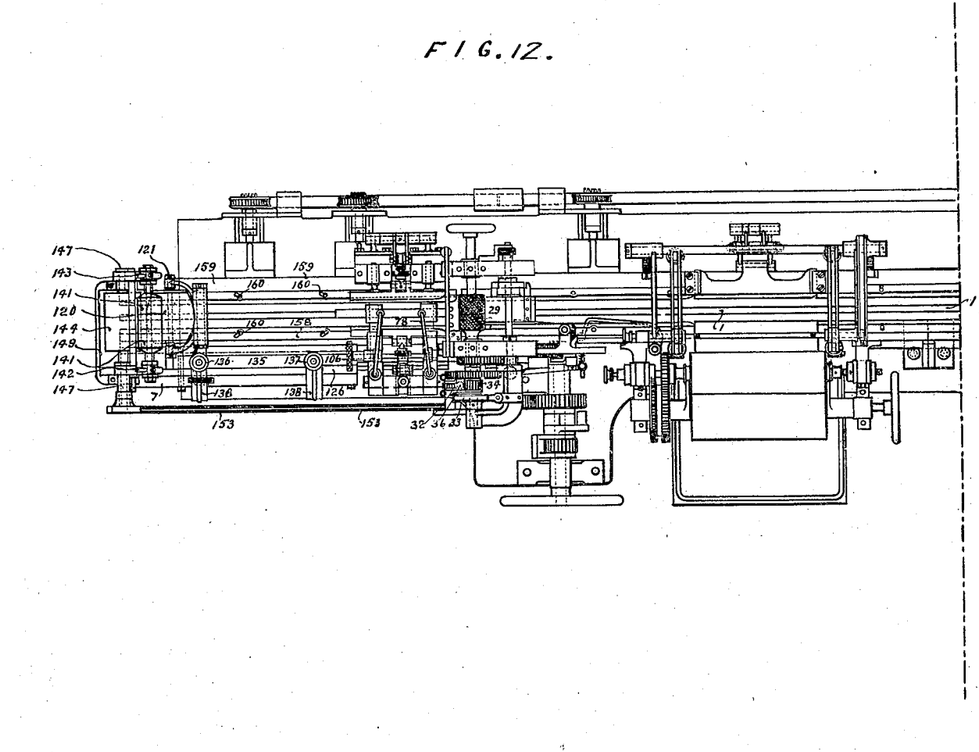
Fig. 12 is a plan and Fig. 13 is a side elevation of that portion of an assembled machine in which are located the features to which the present invention relates.
Figure 13:
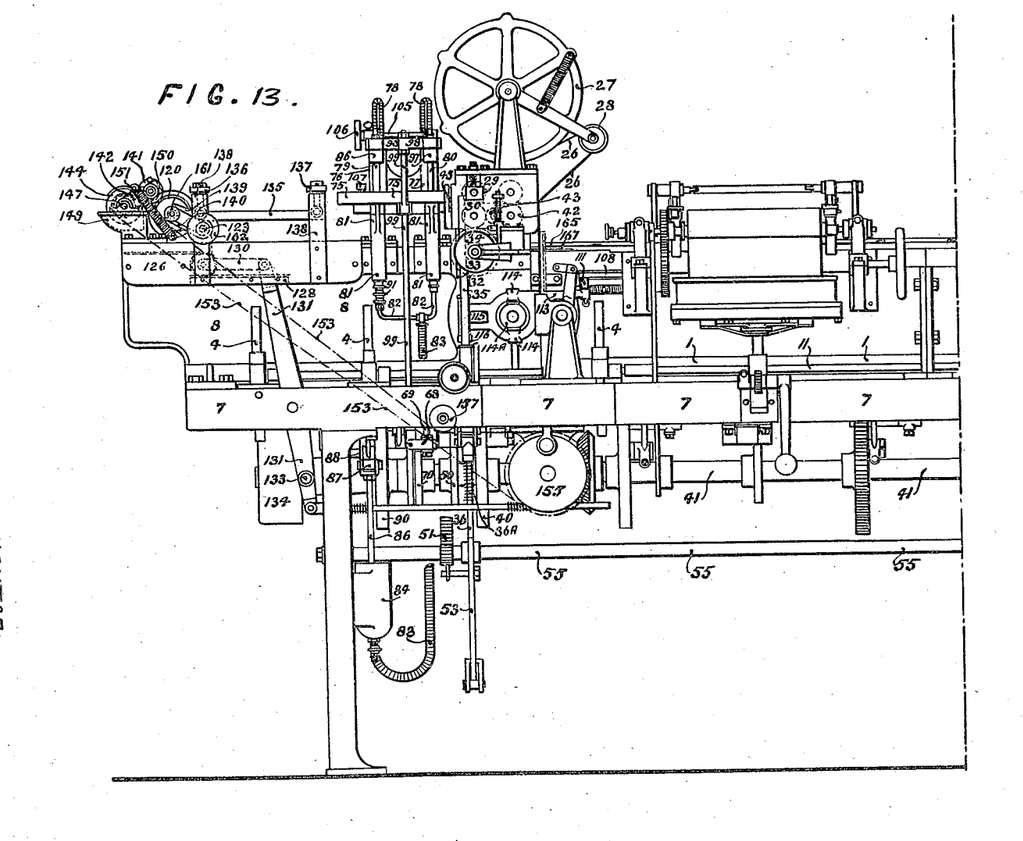

As shown in Figs. 10 and 11 to insure that each book is correctly brought up to the point at which it receives paper, there is provided a reciprocating member 165 guided longitudinally in the main rail 8. This member has on it a lug 166 to which is pivoted a pawl finger 167, the inclined inner edge of which is normally kept out beyond the inner edge of the main rail by a small spring 168 extending between a rearward extension 169 on the finger and a stud 170 screwed into the lug 166. The reciprocating member 165 has on its underside a rack 171 gearing with a pinion 172 on a spindle 173 on which are also two smaller pinions 174, 175 fixed to the larger pinion and gearing with fixed racks 176. The spindle is carried by an arm 177 pivoted to the upper end of a lever 178 pivoted in turn at its lower end and having on it an extension 179 carrying a roller 180 acted on by a cam 181 on a shaft 182 driven through gearing (not shown) from the main shaft. A spring 183 brings back the lever 178 after each forward movement imparted to it by the cam. As the book is brought forward it displaces the pawl finger 167, and when past that finger the spring 168 brings the latter out again, so that, on the finger being moved forward by the rack and pinion mechanism actuated by the cam 181 as hereinbefore described, the inwardly projecting part of the finger bears on the book and pushes it forward to the correct position where the paper is to be applied.

What I claim is:—

1. In a lining machine for books, a rail on which the books slide as they pass through the machine, said rail having its upper face curved to fit within the curve of the fore edge of the books, means for adjusting said rail both vertically and horizontally, side supporting rails lying on each side of said fore-edge supporting rail, one of said side rails being stationary and the other horizontally adjustable.

2. In a lining machine for books, a rail on which the books slide as they pass through the machine, said rail having its upper face curved to fit within the curve of the fore-edge of the books, means for adjusting said rail both vertically and horizontally, side supporting rails lying on each side of said fore-edge supporting rail, one of said side rails being stationary and the other horizontally adjustable, and means for adjusting said side rail and fore-edge rail simultaneously in the same direction.

3. In a lining machine for books, a rail on which the books slide as they pass through the machine, said rail having its upper face curved to fit within the curve of the fore-edge of the books, means for adjusting said rail both vertically and horizontally, side supporting rails lying on each side of said fore-edge supporting rail, one of said side rails being stationary and the other horizontally adjustable, and means for adjusting said side rail and fore-edge rail simultaneously in the same direction, and at different speeds in order to maintain said fore-edge rail equally spaced between the stationary and fixed side rails.

4. In a machine for lining books, a roll for carrying lining material of a width substantially equal to the width of the book back and having its axis arranged transversely to the book back, means for cutting said material to proper length, suction-operated means for transferring the cut length to the book back, means for smoothing said material on the book back, and means for feeding the books with their backs uppermost to the point of application of said material.

5. In a machine for lining books, a roll for carrying lining material of a width substantially equal to the width of the book back and having its axis arranged transversely to the book back, means for cutting said material to proper length, suction operated means for transferring the cut length to the book back, a highly elastic smoothing roller having its axis transverse to and above the book backs, means for applying and retracting said roller, means for moistening said roller and means for feeding the books with the backs uppermost to the point of application of said material.

6. In a machine for lining books, means for supporting upon their fore-edge a series of books, means for applying lining material to the back of the book and means for intermittently advancing the books through the machine, said means comprising a pawl engaging the end of the book, a reciprocating member carrying the same and having a rack, a pinion engaging the rack, a constantly rotating cam and means for intermittently rotating said pinion from said cam, together with spring means for returning said reciprocating member to position after each actuation by the cam, substantially as described.

In testimony whereof I have signed my name to this specification, in the presence of two subscribing witnesses.

JOHN MURRAY.

Witnesses:
  DAVID FERGUSON,
  WILFRED HUNT.

Copies of this patent may be obtained for five cents each, by addressing the "Commissioner of Patents, Washington, D. C."